(12) United States Patent
Zhong et al.

(10) Patent No.: US 9,139,777 B2
(45) Date of Patent: Sep. 22, 2015

(54) COMPOSITION OF LIQUID CRYSTAL MEDIUM

(71) Applicant: Shenzhen China Star Optoelectronics Technology Co., Ltd., Shenzhen, Guangdong (CN)

(72) Inventors: Xinhui Zhong, Shenzhen (CN); Kuancheng Lee, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 130 days.

(21) Appl. No.: 14/124,714

(22) PCT Filed: Sep. 4, 2013

(86) PCT No.: PCT/CN2013/082951
§ 371 (c)(1),
(2) Date: Dec. 8, 2013

(87) PCT Pub. No.: WO2015/027531
PCT Pub. Date: Mar. 5, 2015

(65) Prior Publication Data
US 2015/0210922 A1 Jul. 30, 2015

(51) Int. Cl.
C09K 19/32 (2006.01)
C09K 19/56 (2006.01)
C09K 19/30 (2006.01)
C09K 19/54 (2006.01)

(52) U.S. Cl.
CPC ............. *C09K 19/56* (2013.01); *C09K 19/3003* (2013.01); *C09K 19/54* (2013.01); *C09K 2019/301* (2013.01); *C09K 2019/3004* (2013.01); *C09K 2019/3009* (2013.01); *C09K 2019/3016* (2013.01)

(58) Field of Classification Search
CPC .................................................. C09K 19/20
USPC ..................................................... 252/299.62
See application file for complete search history.

(56) References Cited

FOREIGN PATENT DOCUMENTS

| | | |
|---|---|---|
| CN | 102660300 A | 9/2012 |
| CN | 102746855 A | 10/2012 |
| CN | 103087454 A | 5/2013 |
| CN | 103254356 A | 8/2013 |
| CN | 103194244 A | 10/2013 |
| CN | 103484131 A | 1/2014 |
| WO | WO2013103153 A1 | 7/2013 |

*Primary Examiner* — Chanceity Robinson
(74) *Attorney, Agent, or Firm* — Andrew C. Cheng

(57) ABSTRACT

The present invention provides a composition of liquid crystal medium. The composition of liquid crystal medium includes a negative type liquid crystal material, a stabilizer, one or more than one type of polymerizable monomers capable of forming a polymerization under ultraviolent irradiation and a polymerizable photo-initiator; wherein a structural formula of the polymerizable monomers comprises at least one aromatic ring and at least a polymerizable group connected to the aromatic ring. In the composition of liquid crystal medium according to the present invention, a structural formula of the polymerizable monomers includes at least one aromatic ring and at least a polymerizable group connected to the aromatic ring, and a structural formula of the polymerizable photo-initiator includes a benzene ring or cyclohexane so as to provide a broader conjugate system than conventional photo-initiators. Therefore, the composition of liquid crystal medium can greatly increase initiation efficiency of a polymerization.

16 Claims, 2 Drawing Sheets

COMPOSITION OF LIQUID CRYSTAL MEDIUM

FIELD OF THE INVENTION

The present invention relates to a technique of liquid crystal display, and more particularly to a composition of liquid crystal medium capable of increasing initiation efficiency of a polymerization.

BACKGROUND OF THE INVENTION

With the progress of communicating technique, electronic products such as cell phones, computers and even house electric equipment are getting to have intelligent, portable and mobile functionalities, so that efficiency of exchanging information between users and such electronic products become a critical point of the progress of communicating technique. For an aspect of clearly and efficiently delivering information to users with such electronic products, a display of such electronic products is designed to meet multiple demands such as high efficiency, upgraded quality, large memory capacity, lower weight, lower cost and lower power consumption. Consequentially, the conventional CRT display was replaced by the liquid crystal display (LCD) in just a few years.

In early stage, the LCD is the twisted nematic (TN) or the super twisted nematic (STN) type, and liquid crystal molecules with a chiral agent disposed in the TN/STN type LCD is a positive (nematic) type. A long axis of the positive type liquid crystal molecules is parallel to a surface of each substrate of the TN/STN type LCD when no electricity is applied thereto. An orientation of the positive type liquid crystal molecules is determined by a rubbing direction (i.e. alignment direction) formed on an alignment layer which is usually made of polyimide and disposed on the surface of each substrate of the TN/STN type LCD. The alignment directions of the alignment layers respectively disposed on the two substrates of the TN/STN type LCD are perpendicular to each other, whereby the positive type liquid crystal molecules exhibit a continuously twisted arrangement from one substrate to the other substrate, wherein a twisted angle of the positive type liquid crystal molecules in the TN type LCD is about 90 degree, and a twisted angle thereof in the STN type LCD is about 270 degree. Besides the two substrates and the positive type liquid crystal molecules disposed therein, the TN/STN type LCD includes two polarizer layers and a backlight, wherein the two polarizer layers are respectively adhered to outer surfaces of the two substrates and perpendicular to a light-absorbing axis of each substrate. Light emitted from the backlight is polarized by one polarizer layer disposed between the substrate and the back light, then a polarized direction of the polarized light is transformed by the positive type liquid crystal molecules arranged at the twisted angle, and then the polarized light passes through the other polarizer layer, so as the TN/STN type LCD is on transmitting state (also called "white state"). When a voltage is applied to the TN/STN type LCD, the long axis of the positive type liquid crystal molecule tends to align according to the direction of electric field, and the polarized light is passed through the untwisted liquid crystal molecules then reflected by the other polarizer layer, so as the TN/STN type LCD is on reflecting state (also called "black state"). Drawbacks of the TN/STN type LCD are small viewable angle, severe brightness difference and color difference at large view angles. Therefore, a compensation film must be applied thereto for correcting such drawbacks, and it causes to increase the manufacture cost of the TN/STN type LCD.

A thin-film transistor liquid crystal display (TFT-LCD) of Multi-domain vertical alignment (MVA) type provides an excellent solution to the view angle limitation that the TN/STN type LCD is subjected to, and it uses negative (nematic) type liquid crystal molecules and vertical type alignment films. When no voltage is applied to the MVA type TFT-LCD, the long axis of the negative type liquid crystal molecules is perpendicular to the surface of the substrate. A voltage applied to the MVA type TFT-LCD would cause the negative type liquid crystal molecules to tilt, and the long axis of the negative type liquid crystal molecules is allowed to align in a direction perpendicular to the electric field. To overcome the view angle limitation, a pixel of the MVA type TFT-LCD is divided into multiple domains, and the negative type liquid crystal molecules disposed therein are caused to tilt in different directions so that the MVA type TFT-LCD can provide similar viewing effect at various directions.

Several ways can be adopted to allow liquid crystal molecules, disposed in different domains of a pixel, orienting in different directions respectively. As shown in FIG. 1, the first way is to form bumps 5 on upper and lower substrate 1, 2 having ITO electrodes 3, 4 respectively formed thereon by means of exposing development, so that the bumps 5 can cause a pre-tilt angle for liquid crystal molecules around the bumps 5, and thus guide the other liquid crystal molecules 6 to tilt to predetermined directions.

As shown in FIG. 2, the second way is to form upper and lower ITO electrodes 22, 24 that are of predetermined patterns on upper and lower substrates 12, 14 respectively, so that an electric field induces a predetermined tilt angle, thereby controlling the orientation of the liquid crystal molecules 60 in different domains. The second way is often called patterned vertical alignment (PVA).

As shown in FIG. 3, the third way, so-called polymer stabilized vertical alignment (PSVA) technique, is to form a patterned ITO electrode 204, usually formed as a fishbone type, on one substrate 104, and to form a full-layer ITO electrode 202 (Full ITO) over the other substrate 102, and polymerizable monomers 800 are added in the liquid crystal medium. An electric field is firstly applied to cause tilting liquid crystal molecules 600 in the liquid crystal medium, and then irradiation of ultraviolet is applied to cause a polymerization of the polymerizable monomers 800 to form bumps 400 deposited on the surface of the substrate, and the bumps 400 can guide a tilting angle of the liquid crystal molecules 600. In comparison to the other MVA techniques, the PSVA technique has a lot of advantages such as higher transmission, higher contrast and faster response, so that the PSVA technique becomes a mainstream technique of fabricating large-size TFT-LCD. A key point in the PSVA technique is to control a polymerization of the polymerizable monomers, wherein to control the polymerization reaction includes a photo-reaction rate, homogeneity of the bumps, and unreacted residue of the polymerizable monomers. A high quality PSVA LCD may be obtained after the above key point has been well controlled. However, initiation efficiency of the polymerization thereof is relatively low by using conventional photo-initiators.

Therefore, there is a need of providing a novel photo-initiator which can effectively utilize energy of ultraviolet so as to increase initiation efficiency of the polymerization thereof.

SUMMARY OF THE INVENTION

In accordance with the present invention, a composition of liquid crystal medium is provided for use in PSVA LCD, the composition of liquid crystal medium has an obviously increased initiation efficiency of polymerization of polymerizable monomers, moreover, is conductive to control of the polymerization thereof.

In accordance with an aspect, the composition of liquid crystal medium includes a negative type liquid crystal material, a stabilizer, one or more than one type of polymerizable monomers capable of forming a polymerization under ultra-violet irradiation and a polymerizable photo-initiator; wherein a structural formula of the polymerizable monomers comprises at least one aromatic ring and at least a polymerizable group connected to the aromatic ring, in case the aromatic ring is a benzene ring, a number of the benzene ring(s) is one or two which the two benzene rings directly connect to each other, or indirectly connect via a group, and in case the aromatic ring is a naphthalene, a number of naphthalene is one; the polymerizable photo-initiator having a structural formula selected from one of following formulas:

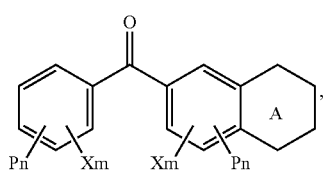

formula 1

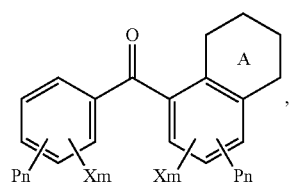

formula 2

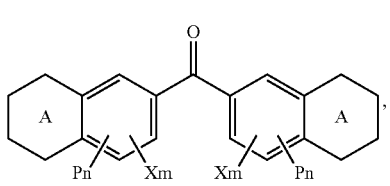

formula 3

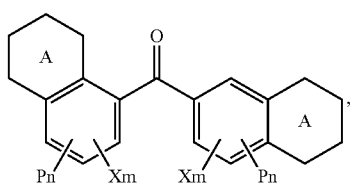

formula 4

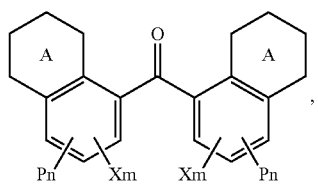

formula 5

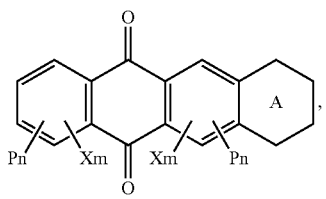

formula 6

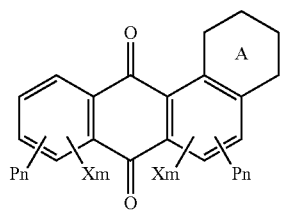

formula 7

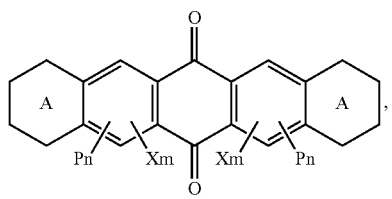

formula 8

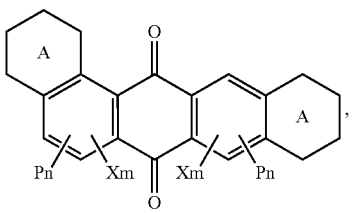

formula 9 and

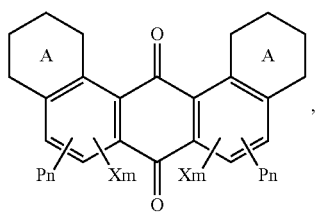
formula 10 in the formula 1~10, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, wherein one or more than one methyl in the branched-chain alkyl group composed of 2-8 carbon atoms can be substituted by an oxygen atom or sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring;

in the formula 1-10 represents a substituted or unsubstituted benzene ring or cyclohexane structure, and in case

is the substituted benzene ring or cyclohexane structure, the substituent group is the polymerizable group.

In a preferred embodiment, one or more than one type of the polymerizable monomers has/have a structural formula (s) selected from at least one of following formulas, and in case more than one type of the polymerizable monomers are of the same structural formula, numbers of the polymerizable groups in different type of the polymerizable monomers are different from each other:

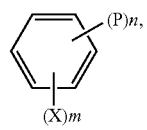
formula 11

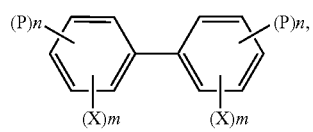
formula 12

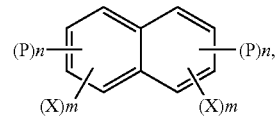
formula 13 and

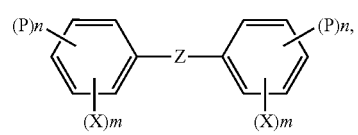
formula 14 in the formula 11-14, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring; in the formula 14, Z is —O—, —COO—, —OCO—, —CH$_2$O—, —OCH$_2$O—, —O(CH$_2$)$_2$O—, —COCH$_2$—, methylene, —C≡C—,

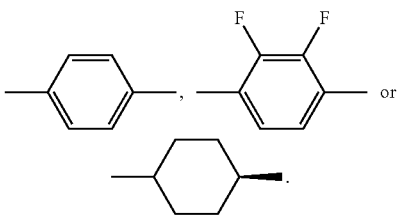

In a preferred embodiment, a mass ratio of the polymerizable monomers to the composition of liquid crystal medium is in 0.1~1%.

In a preferred embodiment, a hydrogen atom in any aromatic ring in the structural formula of the polymerizable monomers is substituted by a group as: —F, —Cl, —Br, methyl or —CN.

In a preferred embodiment, the polymerizable monomers have structural formulas selected from at least two or three of following formulas:

formula 15

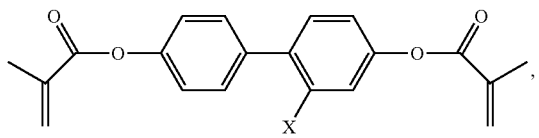

formula 16

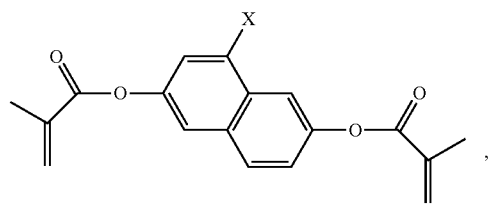

formula 17

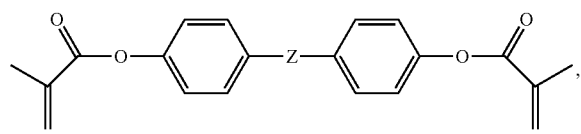

and formula 18

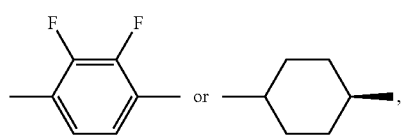

in the formula 15-16, X is —H, —F or —CN; in the formula 17-18, Z is —O—, —COO—, —OCO—, —CH$_2$O—, —OCH$_2$O—, —O(CH$_2$)$_2$O—, —COCH$_2$—, methylene, —C≡C—,

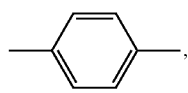

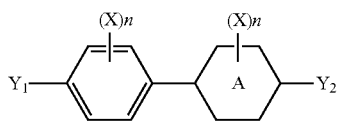

and a molar ratio of the polymerizable monomers having one of the two or three structural formulas to all the polymerizable monomers is not greater than 98%.

In a preferred embodiment, the negative type liquid crystal material comprises liquid crystal molecules having structural formulas as follows:

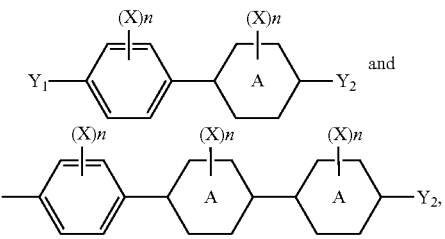

wherein

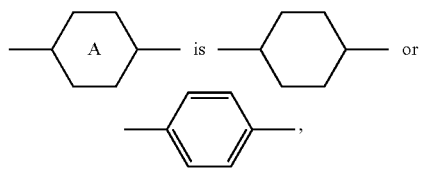

in case plural

are in the same liquid crystal molecule, the plural

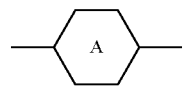

are identical or different; X represents a substituent group connected to the ring structure, and is selected from at least one of —H, —F, —Cl, —Br, —I, —CN and —NO$_2$, n is a number of the substituent group(s) connected to a ring structure in the structural formulas, n is an integer of 1-4, n in the different ring structures are identical or different, and in case n is greater than 1, the substituent groups are identical or different; Y$_1$ and Y$_2$ are —R, —OR, —CO—R, —OCO—R, —COO—R, or —(OCH$_2$CH$_2$)n$_1$CH$_3$, wherein R represents a straight-chain or branched-chain alkyl group composed of 1-12 carbon atoms, n$_1$ is an integer of 1-5, and Y$_1$ is identical to or different from Y$_2$.

In a preferred embodiment, in case the liquid crystal molecules having the structural formula as is

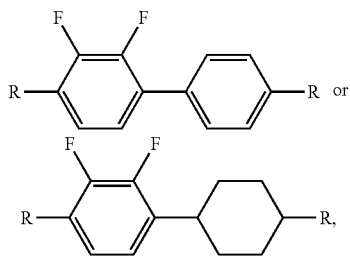

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and in case the liquid crystal molecules having the structural formula as

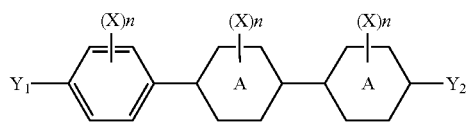

is

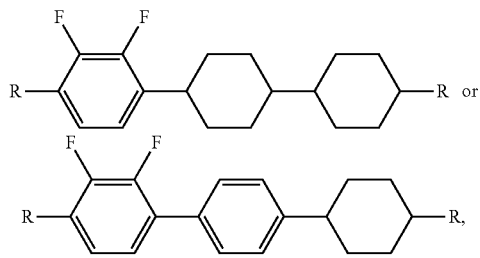

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and a mass ratio of the negative type liquid crystal material to the composition of liquid crystal medium is in 20%-90%.

In a preferred embodiment, the stabilizer comprises at least one stabilizer molecule having a structural formula as follow:

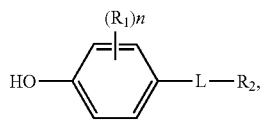

wherein $R_1$ represents at least one of straight-chain or branched-chain alkyl groups composed of 1-9 carbon atoms, n is an integer of 1-4, and in case n is greater than 1, the plural substituent groups $R_1$ are identical or different; R2 represents a straight-chain or branched-chain alkyl group composed of 1-36 carbon atoms; L is carbon-carbon single bond, —O—, —COO—, —OCO—, —CH$_2$O—, —OCH$_2$O—, —O(CH$_2$)$_2$O—, —COCH$_2$—, or methylene group.

In a preferred embodiment, the stabilizer comprises at least one stabilizer molecule having a structural formula as follow:

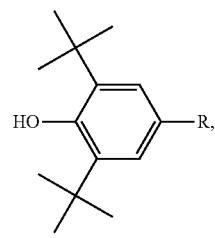

wherein R represents a straight-chain or branched-chain alkyl group composed of 1-30 carbon atoms, and one or more than one non-adjacent methylene group in the straight-chain or branched-chain alkyl group is/are substituted with an oxygen atom or a sulfur atom.

In a preferred embodiment, a mass ratio of the stabilizer to the composition of liquid crystal medium is greater than 0 and less than 1%.

In accordance with another aspect, the composition of liquid crystal medium includes a negative type liquid crystal material, a stabilizer, one or more than one type of polymerizable monomers capable of forming a polymerization under ultraviolent irradiation and a polymerizable photo-initiator; wherein a structural formula of the polymerizable monomers comprises at least one aromatic ring and at least a polymerizable group connected to the aromatic ring, in case the aromatic ring is a benzene ring, a number of the benzene ring(s) is one or two which the two benzene rings directly connect to each other, or indirectly connect via a group, and in case the aromatic ring is a naphthalene, a number of naphthalene is one; the polymerizable photo-initiator having a structural formula selected from one of following formulas:

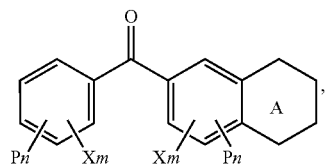

formula 1

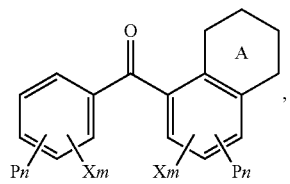

formula 2

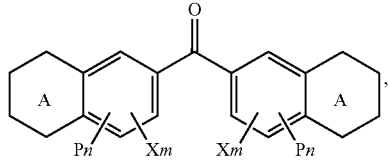

formula 3 formula 4

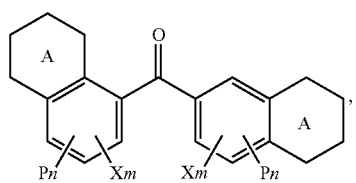

formula 5

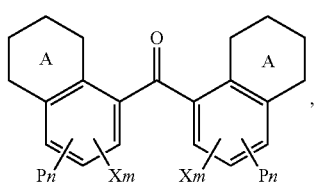

formula 6

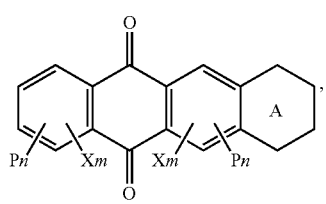

formula 7

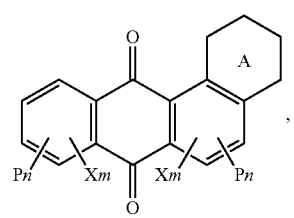

formula 8

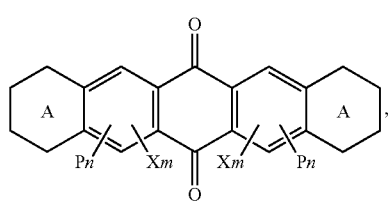

formula 9

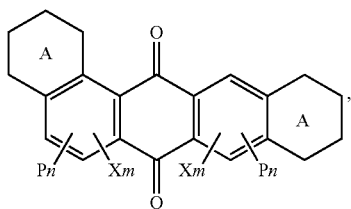

and formula 10 in the formula 1~10, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, wherein one or more than one methyl in the branched-chain alkyl group composed of 2-8 carbon atoms can be substituted by an oxygen atom or sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring;

in the formula 1-10 represents a substituted or unsubstituted benzene ring or cyclohexane structure, and in case

is the substituted benzene ring or cyclohexane structure, the substituent group is the polymerizable group; one or more than one type of the polymerizable monomers has/have a structural formula selected from at least one of following formulas, and in case more than one type of the polymerizable monomers are of the same structural formula, numbers of the polymerizable groups in different type of the polymerizable monomers are different from each other:

formula 11
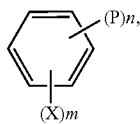

formula 12
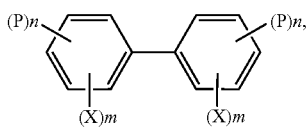

formula 13
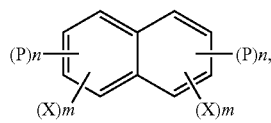

and formula 14
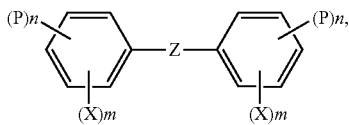

in the formula 11-14, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring; in the formula 14, Z is —O—, —COO—, —OCO—, —CH$_2$O—, —OCH$_2$O—, —O(CH$_2$)$_2$O—, —COCH$_2$—, methylene, —C≡C—,

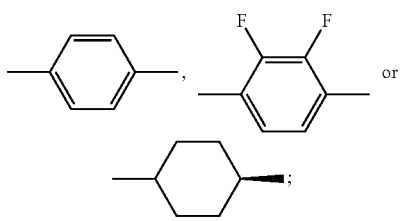

a mass ratio of the polymerizable monomers in the composition of liquid crystal medium is in 0.1~1%; a hydrogen atom in any aromatic ring in the structural formula of the polymerizable monomers is substituted by a group as: —F, —Cl, —Br, methyl or —CN; the negative type liquid crystal material comprises liquid crystal molecules having structural formulas as follows:

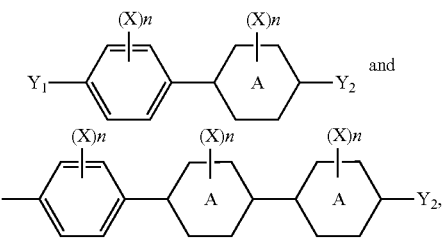

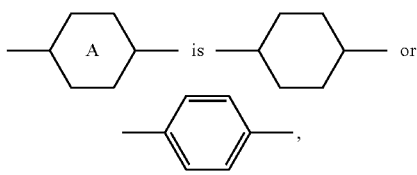

wherein

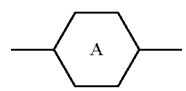 is 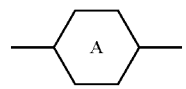 or in case plural are in the same liquid crystal molecule, the plural are identical or different; X represents a substituent group connected to the ring structure, and is selected from at least one of —H, —F, —Cl, —Br, —I, —CN and —NO$_2$, n is a number of the substituent group(s) connected to ring structure, n is an integer of 1-4, n in the different ring structures are identical or different, and in case n is greater than 1, the substituent groups are identical or different; Y$_1$ and Y$_2$ are —R, —OR, —CO—R, —OCO—R, —COO—R or —(OCH$_2$CH$_2$) n$_1$CH$_3$, wherein R represents a straight-chain or branched-chain alkyl group composed of 1-12 carbon atoms, n$_1$ is an integer of 1-5, and Y$_1$ is identical to or different from Y$_2$; and the stabilizer comprises at least one stabilizer molecule having a structural formula as follow:

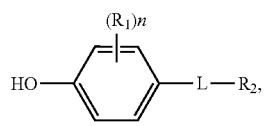

wherein R$_1$ represents at least one of straight-chain or branched-chain alkyl groups composed of 1-9 carbon atoms, n is an integer of 1-4, and in case n is greater than 1, the plural substituent groups $R_1$ are identical or different; R2 represents a straight-chain or branched-chain alkyl group composed of 1-36 carbon atoms; L is carbon-carbon single bond, —O—, —COO—, —OCO—, —CH$_2$O—, —OCH$_2$O—, —O(CH$_2$)$_2$O—, —COCH$_2$— or methylene group.

In a preferred embodiment, the polymerizable monomers have structural formulas selected from at least two or three of following formulas:

formula 15 formula 16 formula 17 and formula 18 in the formula 15-16, X is —H, —F or —CN; in the formula 17-18, Z is —O—, —COO—, —COO—, —CH$_2$O—, —OCH$_2$O—, —O(CH$_2$)$_2$O—, —COCH$_2$—, methylene, —C≡C—,

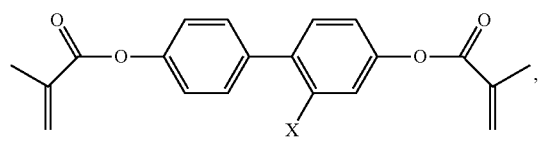

and a molar ratio of the polymerizable monomers having one of the two or three structural formulas to all the polymerizable monomers is not greater than 98%.

In a preferred embodiment, in case the liquid crystal molecules having the structural formula as is

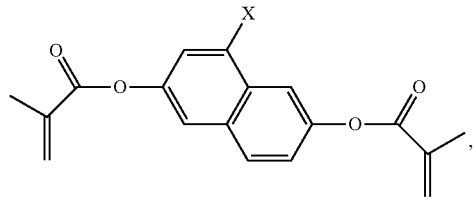

is

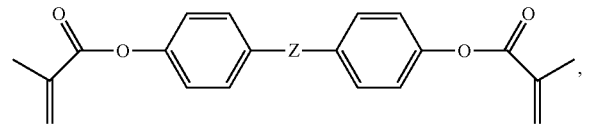

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and in case the liquid crystal molecules having the structural formula as

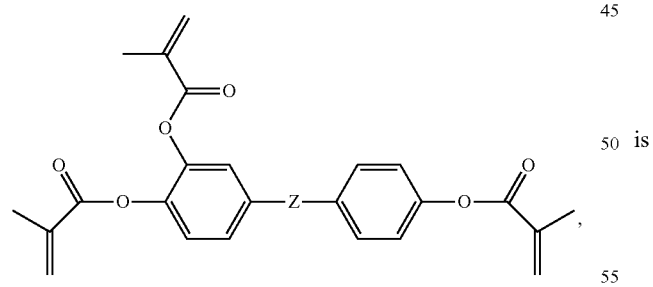

is wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and a mass ratio of the negative type liquid crystal material to the composition of liquid crystal medium is in 20%-90%.

In a preferred embodiment, the stabilizer comprises at least one stabilizer molecule having a structural formula as follow:

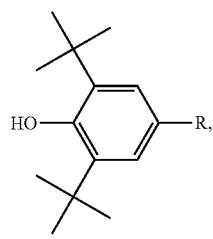

wherein R represents a straight-chain or branched-chain alkyl group composed of 1-30 carbon atoms, and one or more than one non-adjacent methylene group in the straight-chain or branched-chain alkyl group is/are substituted with an oxygen atom or a sulfur atom.

In a preferred embodiment, a mass ratio of the stabilizer to the composition of liquid crystal medium is greater than 0 and less than 1%.

In the composition of liquid crystal medium according to the present invention, a structural formula of the polymerizable monomers includes at least one aromatic ring and at least a polymerizable group connected to the aromatic ring, and a structural formula of the polymerizable photo-initiator includes a benzene ring or cyclohexane so as to provide a broader conjugate system than conventional photo-initiators. Accordingly, the polymerizable photo-initiator can absorb broader wavelength and higher intensity of ultraviolet to effectively initiate the polymerization of the polymerizable monomers. Therefore, the composition of liquid crystal medium can greatly increase initiation efficiency of a polymerization.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
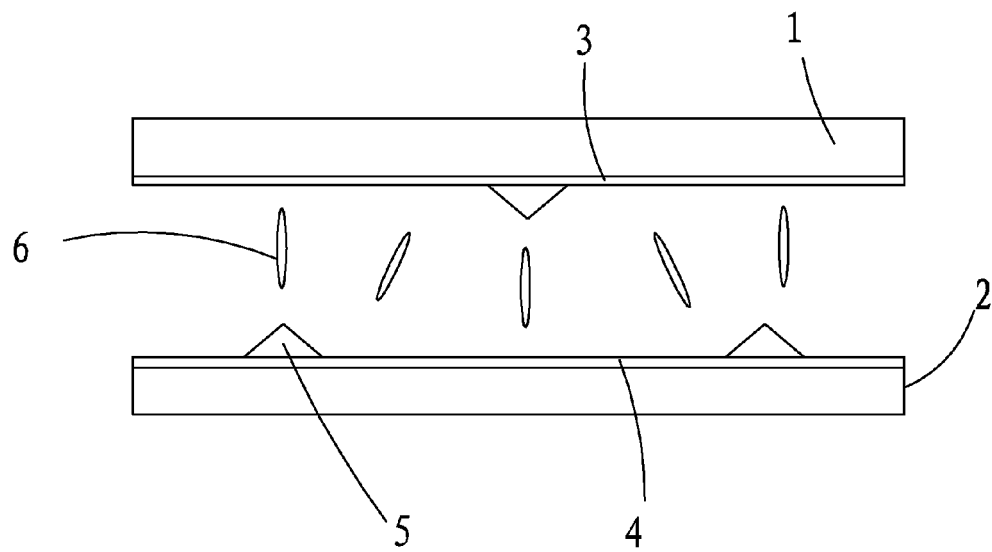
FIG. 1 is schematic a cross-sectional view illustrating bumps of allowing liquid crystal molecules in different regions of a sub-pixel orienting in different directions.
Figure 2:
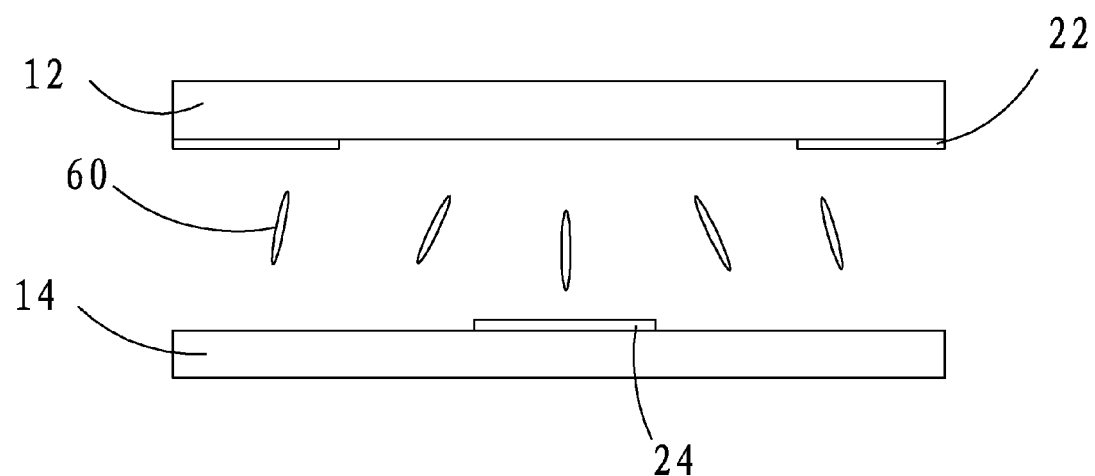
FIG. 2 is a schematic cross-sectional view illustrating PSVA technique of allowing liquid crystal molecules in different regions of a sub-pixel orienting in different directions.
Figure 3:
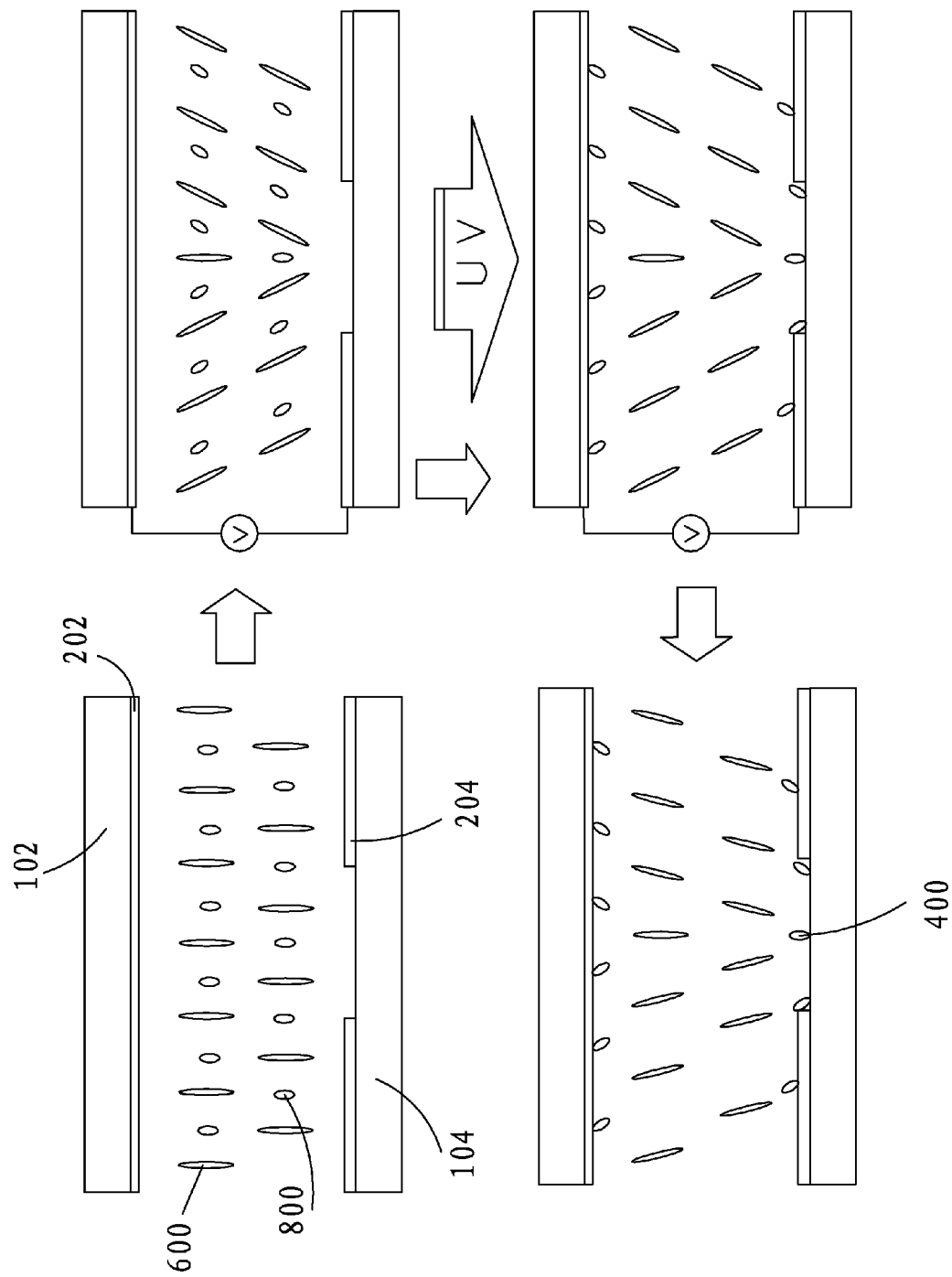
FIG. 3 is a schematic cross-sectional view illustrating a partial process flow of PSVA technique of allowing liquid crystal molecules in different regions of a sub-pixel orienting in different directions.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to the present invention, a composition of liquid crystal medium is provided for use in PSVA LCD, the composition of liquid crystal medium has an obviously increased initiation efficiency of polymerization of polymerizable monomers, moreover, is conductive to control of the polymerization thereof. The composition of liquid crystal medium includes a negative type liquid crystal material, a stabilizer, one or more than one type of polymerizable monomers capable of forming a polymerization under ultraviolent irradiation and a polymerizable photo-initiator; wherein a structural formula of the polymerizable monomers comprises at least one aromatic ring and at least a polymerizable group connected to the aromatic ring, in case the aromatic ring is a benzene ring, a number of the benzene ring(s) is one or two which the two benzene rings directly connect to each other, or indirectly connect via a group, and in case the aromatic ring is a naphthalene, a number of naphthalene is one; the polymerizable photo-initiator having a structural formula selected from one of following formulas:

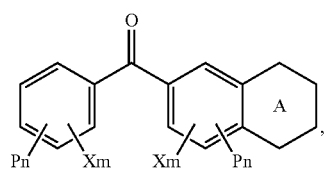

formula 1

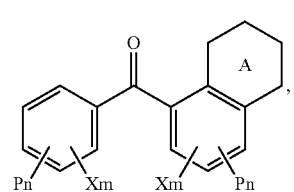

formula 2

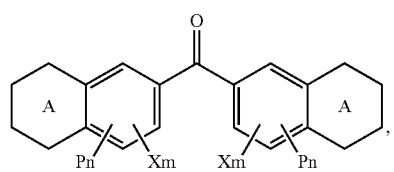

formula 3

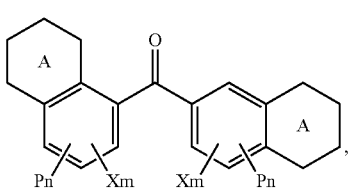

formula 4 formula 5

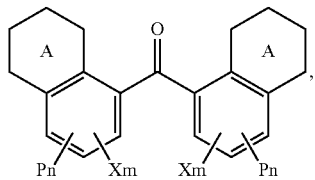

formula 6

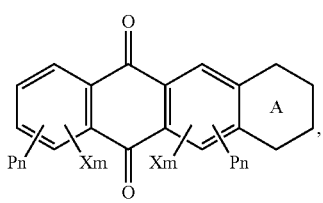

formula 7

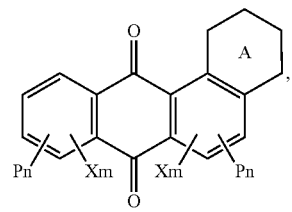

formula 8

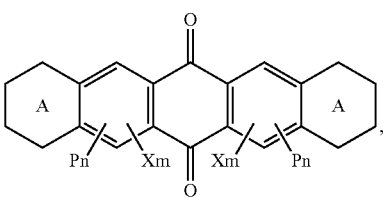

formula 9

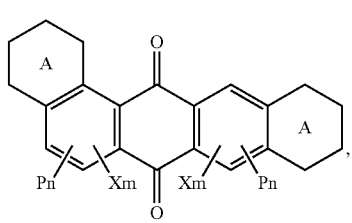

and formula 10

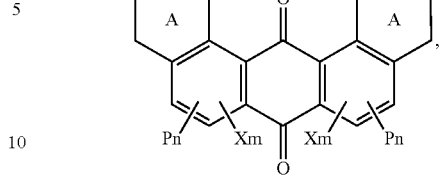

in the formula 1~10, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, wherein one or more than one methyl in the branched-chain alkyl group composed of 2-8 carbon atoms can be substituted by an oxygen atom or sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring;

in the formula 1-10 represents a substituted or unsubstituted benzene ring or cyclohexane structure, and in case

is the substituted benzene ring or cyclohexane structure, the substituent group is the polymerizable group.

According to the conjugate absorption theory, with increasing a number of double bonds in a conjugate system, the maximum absorption wavelength tends to longer wavelength, that is, the novel structural formula of the polymerizable photo-initiator includes so as to absorb broader wavelength and higher intensity of ultraviolet to effectively initiate the polymerization of the polymerizable monomers. Therefore, the polymerizable photo-initiator can greatly increase initiation efficiency of the polymerization by utilizing higher energy of ultraviolet.

The polymerizable photo-initiator absorbs ultraviolet to perform cleavage reaction and degradation of free radicals, which lead to the polymerization of polymerizable monomers. A variety of free radicals is formed by the polymerizable photo-initiator, wherein some free radicals of higher activity such as benzoyl radical are apt to cause polymerization of the polymerizable monomer, and some free radicals of less activity such as phenyl radical are hard to lead polymerization of the polymerizable monomers. However, the structural formula of the polymerizable photo-initiator has the polymerizable groups capable of performing a polymerization, thus the free radicals of less activity can also participate in the polymerization of the polymerizable photo-initiator, so that drawbacks of residual ions can be effectively obviated.

In a preferred embodiment, one or more than one type of the polymerizable monomers has/have a structural formula selected from at least one of following formulas, and in case more than one type of the polymerizable monomers are of the same structural formula, numbers of the polymerizable groups in different type of the polymerizable monomers are different from each other:

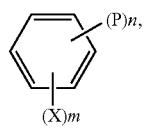

formula 11

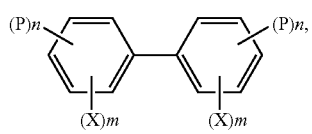

formula 12

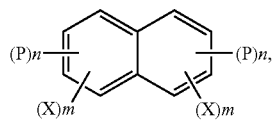

formula 13 and

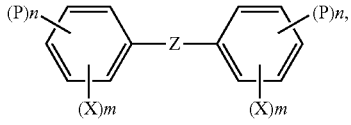

formula 14 in the formula 11-14, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring; in the formula 14, Z is —O—, —COO—, —OCO—, —CH$_2$O—, —OCH$_2$O—, —O(CH$_2$)$_2$O—, —COCH$_2$—, methylene, —C≡C—,

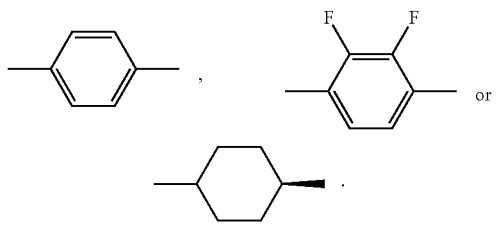

In a preferred embodiment, the polymerizable monomers have structural formulas selected from at least two or three of following formulas:

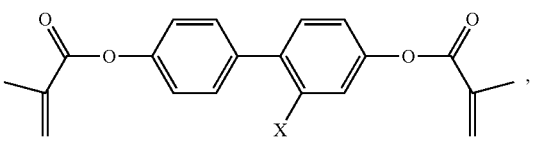

formula 16

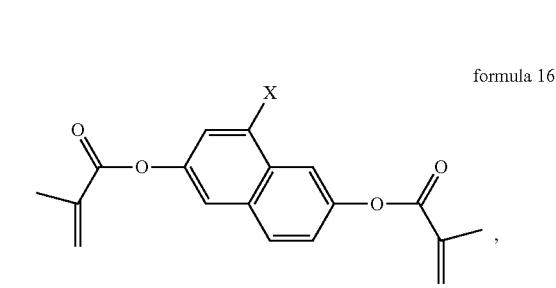

formula 17

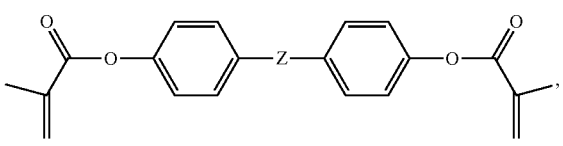

and formula 18

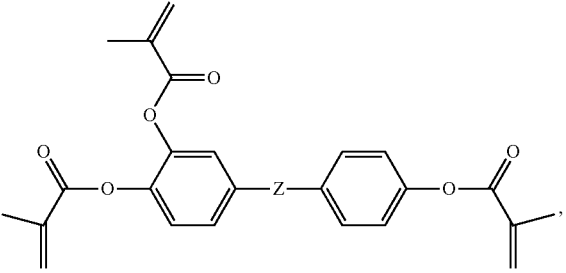

in the formula 15-16, X is —H, —F or —CN; in the formula 17-18, Z is —O—, —COO—, —COO—, —CH$_2$O—, —OCH$_2$O—, —O(CH$_2$)$_2$O—, —COCH$_2$—, methylene, —C≡C—,

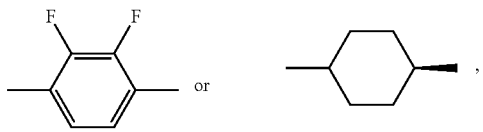

and a molar ratio of the polymerizable monomers having one of the two or three structural formulas to all the polymerizable monomers is not greater than 98%.

In a preferred embodiment, a mass ratio of the polymerizable monomers in the composition of liquid crystal medium is in 0.1~1%, for example: 0.01%, 0.05%, 0.1%, 0.3% or 1%.

Moreover, in a preferred embodiment, a hydrogen atom in any aromatic ring in the above structural formulas of the polymerizable monomers can be substituted by a group as: —F, —Cl, —Br, methyl or —CN.

In a preferred embodiment, the negative type liquid crystal material comprises liquid crystal molecules having structural formulas as follows:

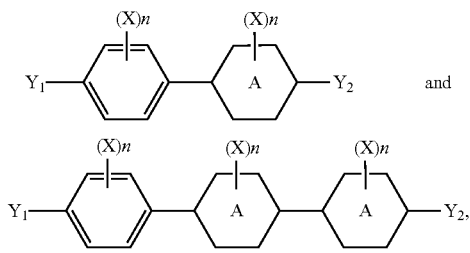

wherein

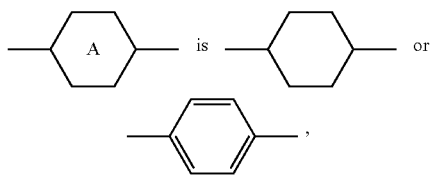

in case plural

are in the same liquid crystal molecule, the plural

are identical or different; X represents a substituent group connected to the ring structure, and is selected from at least one of —H, —F, —Cl, —Br, —I, —CN and —NO$_2$, n is a number of the substituent group(s) connected to ring structure, n is an integer of 1-4, n in the different ring structures are identical or different, and in case n is greater than 1, the substituent groups are identical or different; $Y_1$ and $Y_2$ are —R, —OR, —CO—R, —OCO—R, —COO—R or —(OCH$_2$CH$_2$)$n_1$CH$_3$, wherein R represents a straight-chain or branched-chain alkyl group composed of 1-12 carbon atoms, $n_1$ is an integer of 1-5, and $Y_1$ is identical to or different from $Y_2$.

In a preferred embodiment, a mass ratio of the negative type liquid crystal material to the composition of liquid crystal medium is in 20%-90%, for example: 25%, 35%, 50% or 80%, the mass ratio thereof depends on demands.

It is noted that the negative type liquid crystal material includes but not limited to the above structural formulas. In case the liquid crystal molecules has the structural formula as

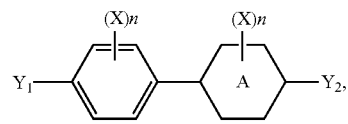

a preferred structural formula thereof is

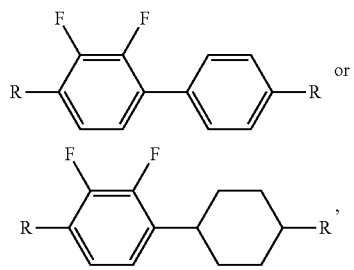

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and in case the liquid crystal molecules having the structural formula as

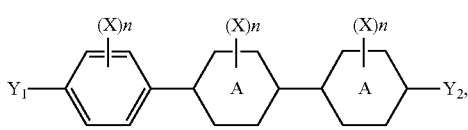

a preferred structural formula thereof is

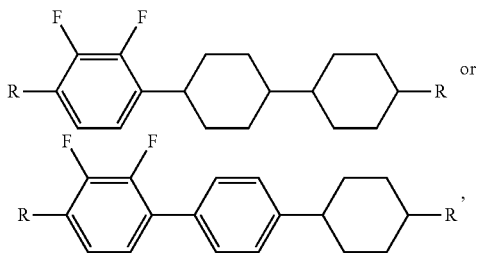

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom. Liquid crystal molecules without double-bond substituent (i.e. conventional vertical alignment type liquid crystal molecules) may be used as the negative type liquid crystal material in the composition of liquid crystal medium according to the present invention.

In a preferred embodiment, the stabilizer comprises at least one stabilizer molecule having a structural formula as follow:

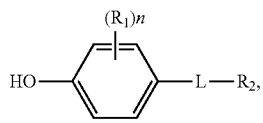

wherein $R_1$ represents at least one of straight-chain or branched-chain alkyl groups composed of 1-9 carbon atoms, n is an integer of 1-4, and in case n is greater than 1, the plural substituent groups $R_1$ are identical or different; R2 represents a straight-chain or branched-chain alkyl group composed of 1-36 carbon atoms; L is carbon-carbon single bond, —O—, —COO—, —OCO—, —CH$_2$O—, —OCH$_2$O—, —O(CH$_2$)$_2$O—, —COCH$_2$— or methylene group. In this embodiment, a preferred structural formula in the above structural formulas of the stabilizer is as follow:

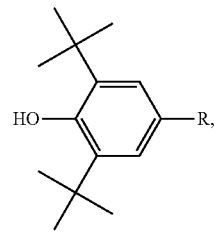

wherein R represents a straight-chain or branched-chain alkyl group composed of 1-30 carbon atoms, and one or more than one non-adjacent methylene group in the straight-chain or branched-chain alkyl group is/are substituted with an oxygen atom or a sulfur atom. A mass ratio of the stabilizer to the composition of liquid crystal medium is greater than 0 and less than 1%, for example: 0.2%, 0.5% or 0.85%. With the stabilizer added in the composition of liquid crystal medium, the composition of liquid crystal medium can be kept at stable state to avoid forming the polymerization of the polymerizable monomers in advance during transport or storage process.

The present invention will now be described more specifically with reference to the following tables illustrating a variety of experiment data of specific embodiments and comparison examples.

In Table 4, character C1 represents the negative type liquid crystal material, and character C1-A represents the negative type liquid crystal material selected in the specific embodiments. C1-A is composed of negative type liquid crystal molecular materials marked as number 1-4 in Table 1 and neutral liquid crystal molecular materials marked as number 5-6 in Table 1, and a mass ratio composition of C1-A is also shown in Table 1.

TABLE 1

| Number | Structural formula of liquid crystal molecular material | Mass ratio composition |
|---|---|---|
| 1 | $C_2H_5O$—[ring with F,F]—[ring]—$C_5H_{11}$ | 10% |
| 2 | $C_3H_7$—[ring with F,F]—[ring]—$C_5H_{11}$ | 15% |
| 3 | $H_3C$—[ring with F,F]—[ring]—[ring]—$C_3H_7$ | 20% |
| 4 | $C_2H_5O$—[ring with F,F]—[ring]—[ring]—$C_5H_{11}$ | 25% |

TABLE 1-continued

| Number | Structural formula of liquid crystal molecular material | Mass ratio composition |
|---|---|---|
| 5 | $C_3H_7$—⬡—⬡—$C_5H_{11}$ | 20% |
| 6 | $C_3H_7$—⬢—⬡—$C_5H_{11}$ | 10% |

In Table 4, character C2 represents the stabilizer, and character C2-A represents the stabilizer selected in the specific embodiments. A structural formula of C2-A is as

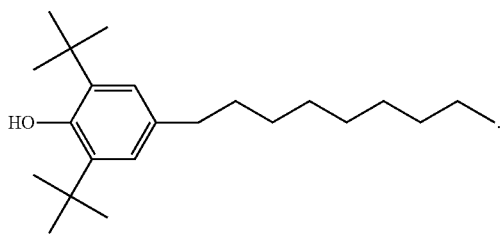 [SMILES: CCCCCCCCCc1cc(C(C)(C)C)c(O)c(C(C)(C)C)c1]

In Table 2 and 4, character C3 represent the polymerizable monomers, characters C3-A to C3-F represent the different type of the polymerizable monomers, and one or more than one of C3-A to C3-F can be selected as the polymerizable monomers in the present invention. In the specific embodiments, to select two from C3-A to C3-F is preferable.

TABLE 2

| Character | Structural formula of the polymerizable monomers |
|---|---|
| C3-A | |
| C3-B | |
| C3-C | |
| C3-D | |

TABLE 2-continued

| Character | Structural formula of the polymerizable monomers |
|---|---|
| C3-E | (structure) |
| C3-F | (structure) |

In Table 3 and 4, character C4 represents the photo-initiator, wherein characters C4-A, C4-B, C4-C, C4-D and C4-E represent the novel polymerizable photo-initiator selected in the specific embodiments according to the present invention, and they are compared to a commercial photo-initiator IRGACURE® 651 manufactured by Ciba company.

TABLE 3

| Character | Structural formula of the photo-initiator |
|---|---|
| C4-A | (structure) |
| C4-B | (structure) |
| C4-C | (structure) |
| C4-D | (structure) |

TABLE 3-continued

| Character | Structural formula of the photo-initiator |
|---|---|
| C4-E | (structural formula) |
| IRGACURE ® 651 (Ciba ®) | (structural formula) |

Table 4 illustrates the variety of experiment data and mass ratio compositions of the specific embodiments and comparison examples.

are the same; and test conditions of VHR include temperature at 60° C., voltage on 1V and holding time of 0.16 s. Please refer to Table 4, with the specific embodiments 2 and 5 added

TABLE 4

| | The negative liquid crystal material Mass ratio % | The stabilizer Mass ratio % | The polymizable monomers 1 Mass ratio % | The polymerizable monomers 2 Mass ratio % | The photo-initiator Mass ratio% | Residue of polymerizable monomers after UV irradiation (by Mass ratio %) | Voltage holding ratio (VHR) after UV irradiation (by %) |
|---|---|---|---|---|---|---|---|
| Embodiment 1 | C1-A 99.64 | C2-A 0.01 | C3-A 0.2 | C3-B 0.1 | C4-A 0.05 | 0.053 | 98.1 |
| Comparison example 1 | C1-A 99.64 | C2-A 0.01 | C3-A 0.2 | C3-B 0.1 | IRGACURE ®651 0.05 | 0.049 | 91.7 |
| Embodiment 2 | C1-A 99.64 | C2-A 0.01 | C3-A 0.2 | C3-B 0.1 | C4-C 0.05 | 0.022 | 99 |
| Comparison example 2 | C1-A 99.69 | C2-A 0.01 | C3-A 0.2 | C3-B 0.1 | — 0 | 0.115 | 95.2 |
| Embodiment 3 | C1-A 99.51 | C2-A 0.01 | C3-B 0.2 | C3-E 0.2 | C4-D 0.08 | 0.068 | 97.5 |
| Comparison example 3 | C1-A 99.51 | C2-A 0.01 | C3-B 0.2 | C3-E 0.2 | IRGACURE ®651 0.08 | 0.065 | 91.1 |
| Embodiment 4 | C1-A 99.6 | C2-A 0.01 | C3-C 0.2 | C3-F 0.15 | C4-E 0.04 | 0.047 | 98.9 |
| Comparison example 4 | C1-A 99.6 | C2-A 0.01 | C3-C 0.2 | C3-F 0.15 | IRGACURE ®651 0.04 | 0.051 | 88.1 |
| Embodiment 5 | C1-A 99.6 | C2-A 0.01 | C3-B 0.2 | C3-F 0.15 | C4-E 0.04 | 0.019 | 96.9 |
| Comparison example 5 | C1-A 99.64 | C2-A 0.01 | C3-B 0.2 | C3-F 0.15 | — 0 | 0.083 | 93.3 |

The experiment data shown in Table 4 is obtained by using a high performance liquid chromatography (HPLC) to test residue of the polymerizable monomers and voltage holding ratio after ultraviolet (UV) irradiation. Under the same UV irradiation, the less residue of the polymerizable monomers means the faster polymerization rate of the polymerizable monomers; and VHR represents contamination in the liquid crystal material has been produced by the photo-initiator, the higher VHR means the less ions produced by the photo-initiator, and the less ions produced by the photo-initiator is more favorable in reliability analysis (RA) of LCD. In the above experiments, test conditions of UV irradiation include using a high pressure mercury lamp having 365 nm intensity of 55 mw/cm² and performing irradiation time of 3 minutes, and the test conditions of UV irradiation in each experiment the polymerizable photo-initiator respectively compared to the comparison examples 2 and 5 not added the photo-initiator, the polymerizable photo-initiator according the present invention provide a significant acceleration in the polymerization of the polymerizable monomers; with the specific embodiments compared to the commercial photo-initiator IRGACURE®651, the polymerizable photo-initiator according the present invention and the commercial photo-initiator IRGACURE®651 provide the same initiation efficiency, but the polymerizable photo-initiator according the present invention performs favorable data in VHR test than the commercial photo-initiator IRGACURE®651 performs therein.

According to the above description, in the composition of liquid crystal medium according to the present invention, a structural formula of the polymerizable monomers includes at least one aromatic ring and at least a polymerizable group connected to the aromatic ring, and a structural formula of the polymerizable photo-initiator includes a benzene ring or cyclohexane so as to provide a broader conjugate system than conventional photo-initiators. Accordingly, the polymerizable photo-initiator can absorb broader wavelength and higher intensity of ultraviolet to effectively initiate the polymerization of the polymerizable monomers. Therefore, the composition of liquid crystal medium can greatly increase initiation efficiency of a polymerization.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A composition of liquid crystal medium, comprising: a negative type liquid crystal material, a stabilizer, one or more than one type of polymerizable monomers capable of forming a polymerization under ultraviolent irradiation and a polymerizable photo-initiator; wherein a structural formula of the polymerizable monomers comprises at least one aromatic ring and at least a polymerizable group connected to the aromatic ring, in case the aromatic ring is a benzene ring, a number of the benzene ring(s) is one or two which the two benzene rings directly connect to each other, or indirectly connect via a group, and in case the aromatic ring is a naphthalene, a number of naphthalene is one; the polymerizable photo-initiator having a structural formula selected from one of following formulas:

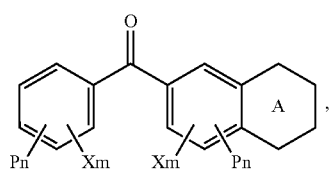

formula 1

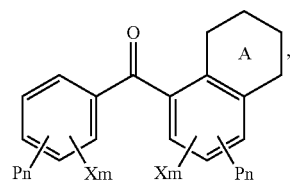

formula 2

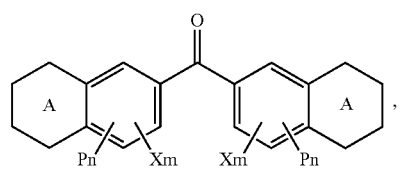

formula 3

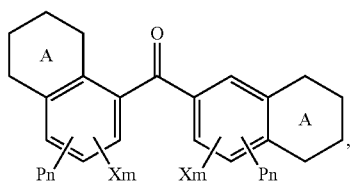

formula 4

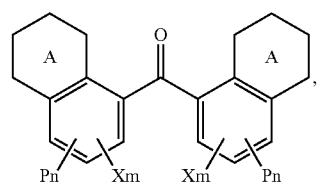

formula 5

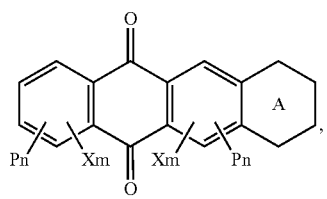

formula 6

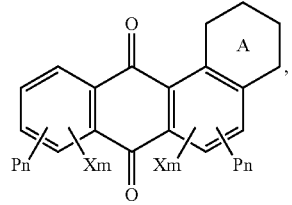

formula 7

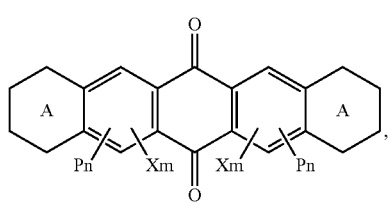

formula 8

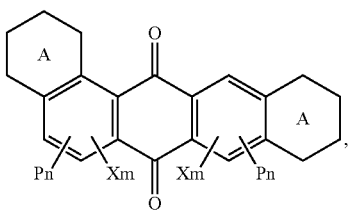

formula 9 and

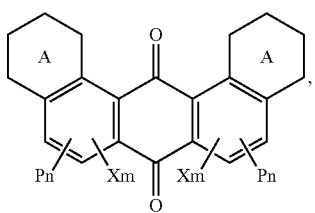

formula 10 in the formula 1~10, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, wherein one or more than one methyl in the branched-chain alkyl group composed of 2-8 carbon atoms can be substituted by an oxygen atom or sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring;

in the formula 1-10 represents a substituted or unsubstituted benzene ring or cyclohexane structure, and in case

is the substituted benzene ring or cyclohexane structure, the substituent group is the polymerizable group.

2. The composition of liquid crystal medium according to claim 1, wherein one or more than one type of the polymerizable monomers has/have a structural formula(s) selected from at least one of following formulas, and in case more than one type of the polymerizable monomers are of the same structural formula, numbers of the polymerizable groups in different type of the polymerizable monomers are different from each other:

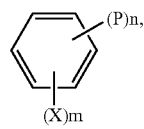

formula 11

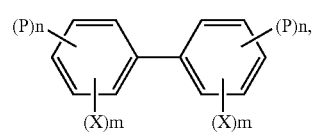

formula 12

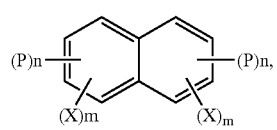

formula 13

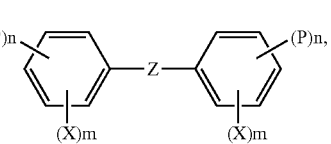

formula 14 in the formula 11-14, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring; in the formula 14, Z is —O—, —COO—, —OCO—, —CH$_2$O—, —OCH$_2$O—, —O(CH$_2$)$_2$O—, —COCH$_2$—, methylene, —C≡C—,

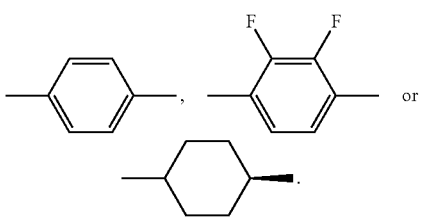

3. The composition of liquid crystal medium according to claim 2, wherein a mass ratio of the polymerizable monomers to the composition of liquid crystal medium is in 0.1~1%.

4. The composition of liquid crystal medium according to claim 2, wherein a hydrogen atom in any aromatic ring in the structural formula of the polymerizable monomers is substituted by a group as: —F, —Cl, —Br, methyl or —CN.

5. The composition of liquid crystal medium according to claim 2, the polymerizable monomers have structural formulas selected from at least two or three of following formulas:

formula 15

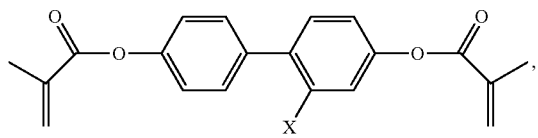

formula 16

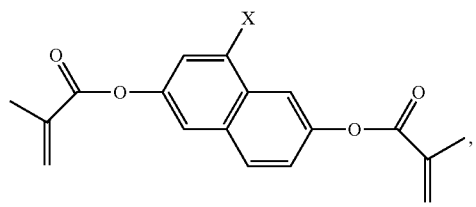

formula 17

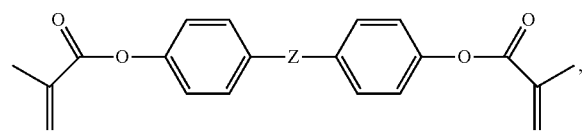

and formula 18

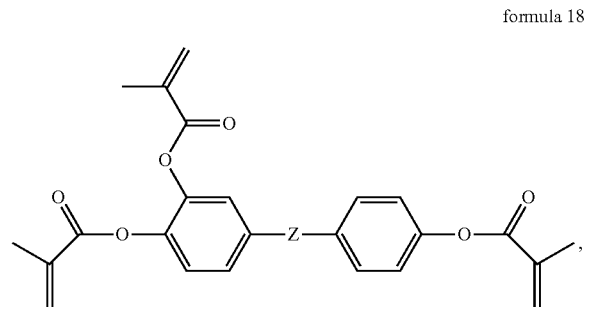

in the formula 15-16, X is —H, —F or —CN; in the formula 17-18, Z is —O—, —COO—, —COO—, —CH$_2$O—, —OCH$_2$O—, —O(CH$_n$)$_2$O—, —COCH$_2$—, methylene, —C≡C—,

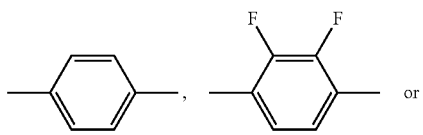 or

-continued

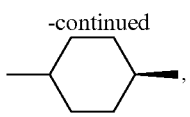

and a molar ratio of the polymerizable monomers having one of the two or three structural formulas to all the polymerizable monomers is not greater than 98%.

6. The composition of liquid crystal medium according to claim 1, wherein a mass ratio of the polymerizable monomers to the composition of liquid crystal medium is in 0.1~1%.

7. The composition of liquid crystal medium according to claim 1, wherein the negative type liquid crystal material comprises liquid crystal molecules having structural formulas as follows:

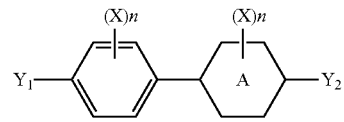

and

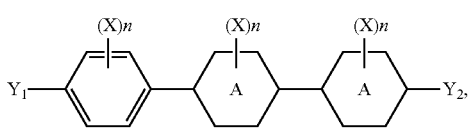

wherein

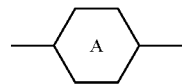

is

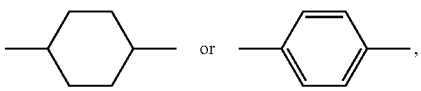, in case plural

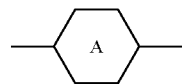

are in the same liquid crystal molecule, the plural

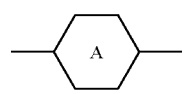

are identical or different; X represents a substituent group connected to the ring structure, and is selected from at least one of —H, —F, —Cl, —Br, —I, —CN and —NO$_2$, n is a number of the substituent group(s) connected to a ring structure in the structural formulas, n is an integer of 1-4, n in the different ring structures are identical or different, and in case n is greater than 1, the substituent groups are identical or different; $Y_1$ and $Y_2$ are —R, —OR, —CO—R, —OCO—R, —COO—R or —(OCH$_2$CH$_2$)n$_1$CH$_3$, wherein R represents a straight-chain or branched-chain alkyl group composed of 1-12 carbon atoms, $n_1$ is an integer of 1-5, and $Y_1$ is identical to or different from $Y_2$.

8. The composition of liquid crystal medium according to claim 7, in case the liquid crystal molecules having the structural formula as

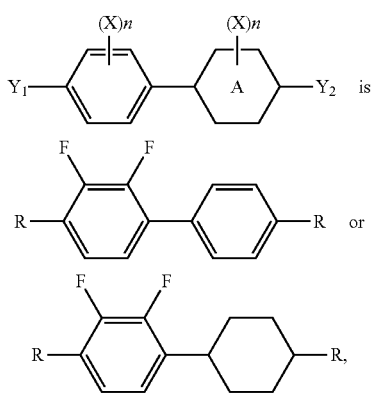

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and in case the liquid crystal molecules having the structural formula as

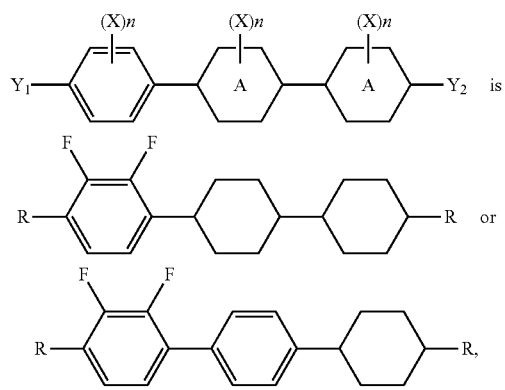

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and a mass ratio of the negative type liquid crystal material to the composition of liquid crystal medium is in 20%-90%.

9. The composition of liquid crystal medium according to claim 1, wherein the stabilizer comprises at least one stabilizer molecule having a structural formula as follow:

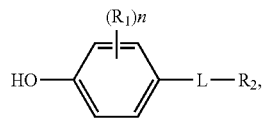

wherein $R_1$ represents at least one of straight-chain or branched-chain alkyl groups composed of 1-9 carbon atoms, n is an integer of 1-4, and in case n is greater than 1, the plural substituent groups $R_1$ are identical or different; R2 represents a straight-chain or branched-chain alkyl group composed of 1-36 carbon atoms; L is carbon-carbon single bond, —O—, —COO—, —OCO—, —CH$_2$O—, —OCH$_2$O—, —O(CH$_2$)$_2$O—, —COCH$_2$— or methylene group.

10. The composition of liquid crystal medium according to claim 9, wherein the stabilizer comprises at least one stabilizer molecule having a structural formula as follow:

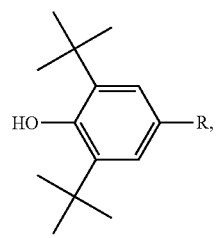

wherein R represents a straight-chain or branched-chain alkyl group composed of 1-30 carbon atoms, and one or more than one non-adjacent methylene group in the straight-chain or branched-chain alkyl group is/are substituted with an oxygen atom or a sulfur atom.

11. The composition of liquid crystal medium according to claim 1, wherein a mass ratio of the stabilizer to the composition of liquid crystal medium is greater than 0 and less than 1%.

12. A composition of liquid crystal medium, comprising: a negative type liquid crystal material, a stabilizer, one or more than one type of polymerizable monomers capable of forming a polymerization under ultraviolent irradiation and a polymerizable photo-initiator; wherein a structural formula of the polymerizable monomers comprises at least one aromatic ring and at least a polymerizable group connected to the aromatic ring, in case the aromatic ring is a benzene ring, a number of the benzene ring(s) is one or two which the two benzene rings directly connect to each other, or indirectly connect via a group, and in case the aromatic ring is a naphthalene, a number of naphthalene is one; the polymerizable photo-initiator having a structural formula selected from one of following formulas:

formula 1

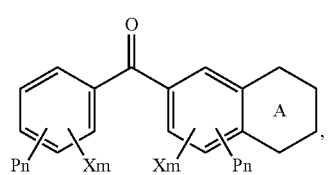

formula 2

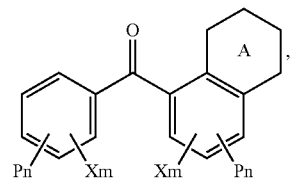

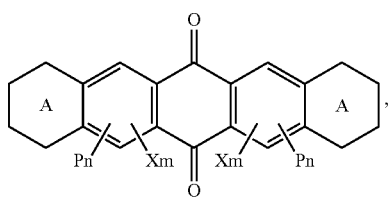

formula 3 formula 8

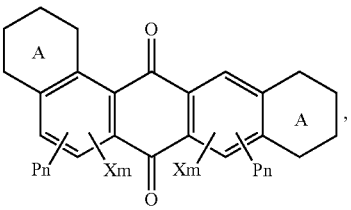

formula 9 formula 4

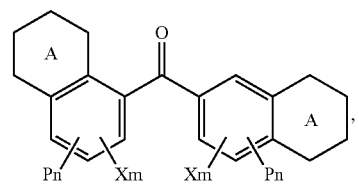

and

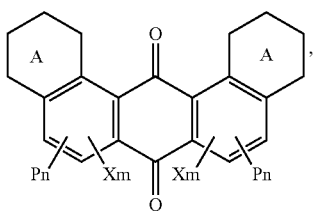

formula 10 formula 5

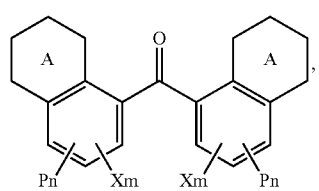

in the formula 1~10, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, wherein one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring;

formula 6

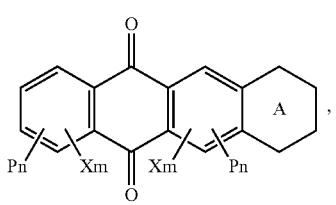

formula 7

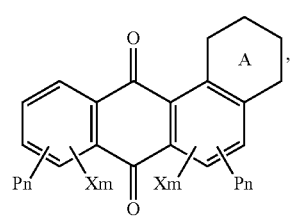

in the formula 1-10 represents a substituted or unsubstituted benzene ring or cyclohexane structure, and in case

is the substituted benzene ring or cyclohexane structure, the substituent group is the polymerizable group; one or more than one type of the polymerizable monomers has/have a structural formula selected from at least one of following formulas, and in case more than one type of the polymerizable monomers are of the same structural formula, numbers of the polymerizable groups in different type of the polymerizable monomers are different from each other:

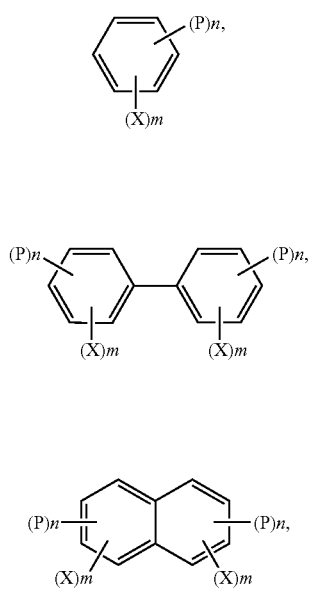

in the formula 11-14, P represents a polymerizable group which is selected from at least one of methacrylate group, acrylate group, vinyl group, ethylene group and epoxy group; n is a number of the polymerizable group(s), n is an integer of 1-3, and in case n is greater than 1, the polymerizable groups are identical or different; X represents a substituent group which is selected from at least one of —F, —Cl, —Br, methyl, —CN and straight-chain or branched-chain alkyl group composed of 2-8 carbon atoms, one or more than one methyl in the branched-chain alkyl group composed of 2-8 carbon atoms can be substituted by an oxygen atom or a sulfur atom; m is a number of the substituent group(s) connected to the same aromatic group, m is an integer of 1-3, and in case m is greater than 1, the substituent groups are identical or different; a sum of n plus m is less than groups capable of connecting to the same aromatic ring; in the formula 14, Z is —O—, —COO—, —OCO—, —CH$_2$O—, —OCH$_2$O—, —O(CH$_2$)$_2$O—, —COCH$_2$—, methylene, —C≡C—,

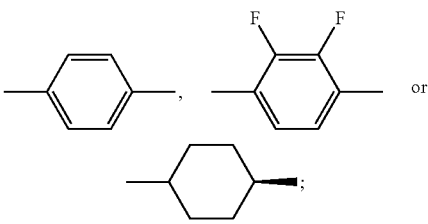

a mass ratio of the polymerizable monomers to the composition of liquid crystal medium is in 0.1~1%; a hydrogen atom in any aromatic ring in the structural formula of the polymerizable monomers is substituted by a group as: —F, —Cl, —Br, methyl or —CN; the negative type liquid crystal material comprises liquid crystal molecules having structural formulas as follows:

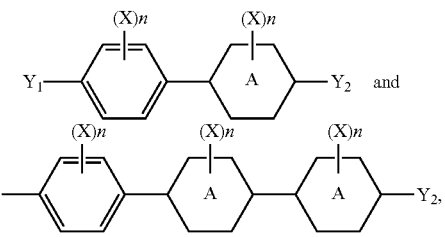

wherein

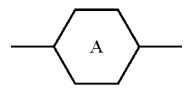

is

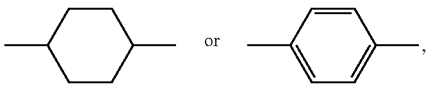

in case plural

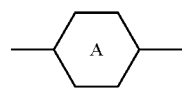

are in the same liquid crystal molecule, the plural

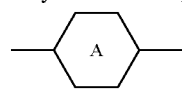

are identical or different; X represents a substituent group connected to the ring structure, and is selected from at least one of —H, —F, —Cl, —Br, —I, —CN and —NO$_2$, n is a number of the substituent group(s) connected to ring structure, n is an integer of 1-4, n in the different ring structures are identical or different, and in case n is greater than 1, the substituent groups are identical or different; Y$_1$ and Y$_2$ are —R, —OR, —CO—R, —OCO—R, —COO—R or —(OCH$_2$CH$_2$)$_{n_1}$CH$_3$, wherein R represents a straight-chain or branched-chain alkyl group composed of 1-12 carbon atoms, n$_1$ is an integer of 1-5, and Y$_1$ is identical to or different from Y$_2$; and the stabilizer comprises at least one stabilizer molecule having a structural formula as follow:

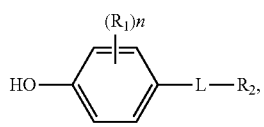

wherein R₁ represents at least one of straight-chain or branched-chain alkyl groups composed of 1-9 carbon atoms, n is an integer of 1-4, and in case n is greater than 1, the plural substituent groups $R_1$ are identical or different; R2 represents a straight-chain or branched-chain alkyl group composed of 1-36 carbon atoms; L is carbon-carbon single bond, —O—, —COO—, —OCO—, —CH₂O—, —OCH₂O—, —O(CH₂)₂O—, —COCH₂— or methylene group.

13. The composition of liquid crystal medium according to claim 12, wherein the polymerizable monomers have structural formulas selected from at least two or three of following formulas:

formula 15

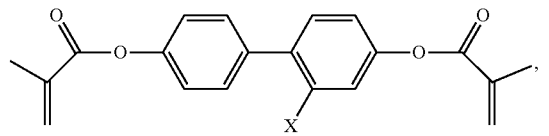

formula 16

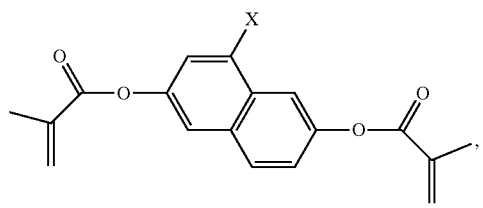

formula 17

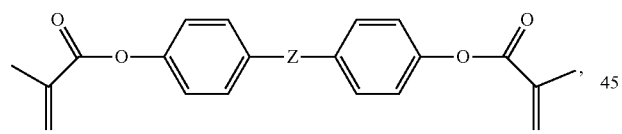

and formula 18

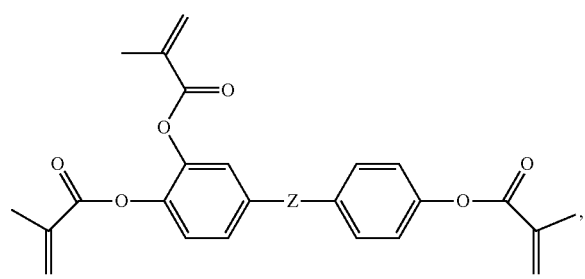

in the formula 15-16, X is —H, —F or —CN; in the formula 17-18, Z is —O—, —COO—, —OCO—, —CH₂O—, —OCH₂O—, —O(CH₂)₂O—, —COCH₂—, methylene, —C≡C—,

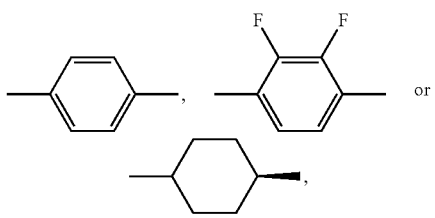

and a molar ratio of the polymerizable monomers having one of the two or three structural formulas to all the polymerizable monomers is not greater than 98%.

14. The composition of liquid crystal medium according to claim 12, in case the liquid crystal molecules having the structural formula as

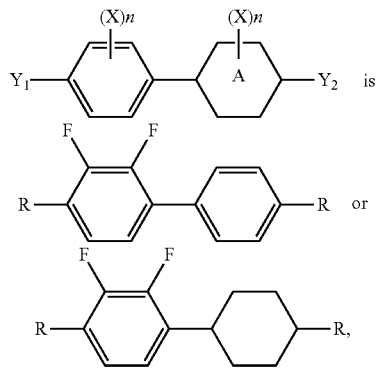

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and in case the liquid crystal molecules having the structural formula as

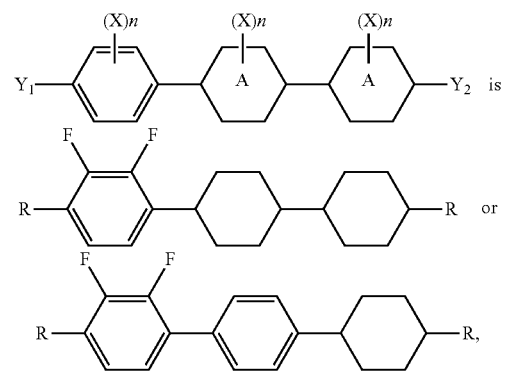

wherein R represents a straight-chain or branched-chain alkyl group composed of 1-9 carbon atoms, one or more than one non-adjacent methylene group in the straight-chain or branched-chain alkyl group is/are substituted with an oxygen atom or a sulfur atom; and a mass ratio of the negative type liquid crystal material to the composition of liquid crystal medium is in 20%-90%.

15. The composition of liquid crystal medium according to claim 12, wherein the stabilizer comprises at least one stabilizer molecule having a structural formula as follow:

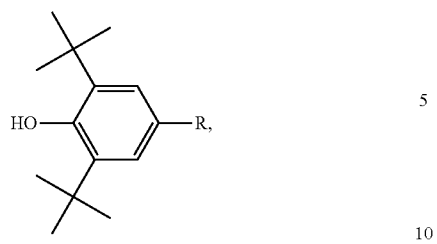

wherein R represents a straight-chain or branched-chain alkyl group composed of 1-30 carbon atoms, and one or more than one non-adjacent methylene group in the straight-chain or branched-chain alkyl group is/are substituted with an oxygen atom or a sulfur atom.

16. The composition of liquid crystal medium according to claim 12, wherein a mass ratio of the stabilizer to the composition of liquid crystal medium is greater than 0 and less than 1%.

* * * * *